H. GILLETTE.
WHEEL RIM.
APPLICATION FILED AUG. 17, 1911.
1,015,557.
Patented Jan. 23, 1912.
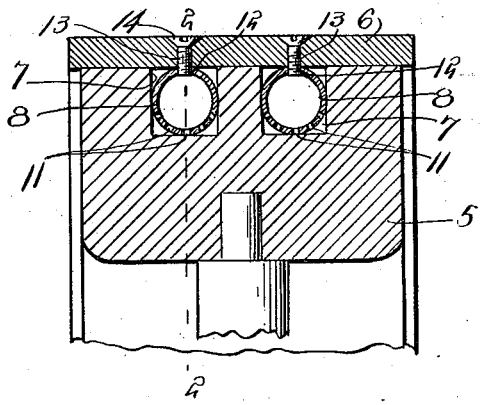
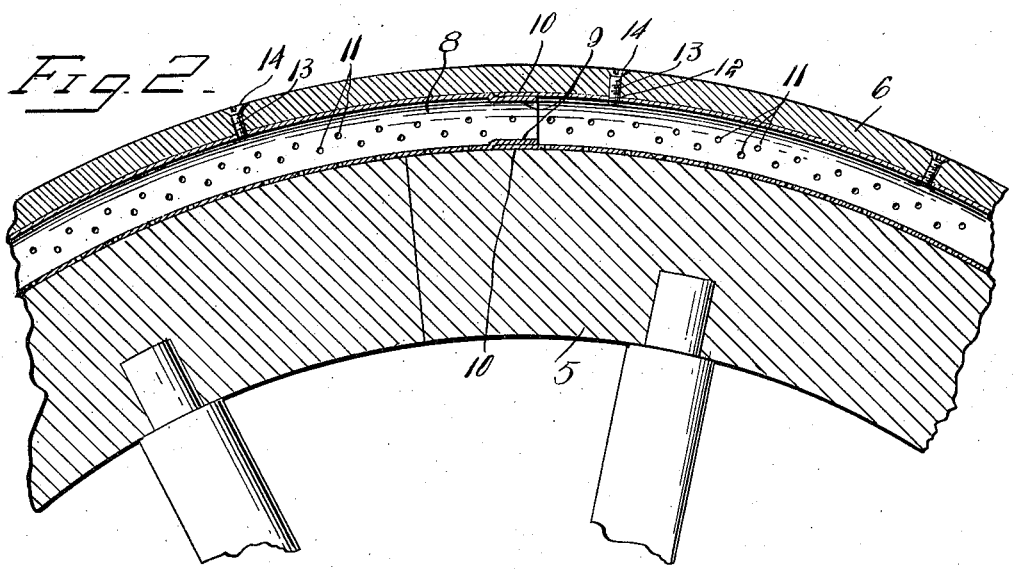
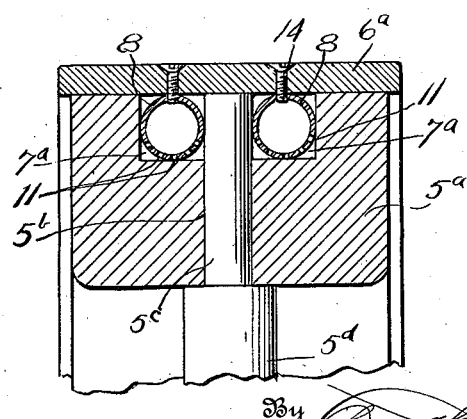
Witnesses
Inventor
H. Gillette
By
Attorneys

UNITED STATES PATENT OFFICE.

HENRY GILLETTE, OF BELPRE, KANSAS.

WHEEL-RIM.

1,015,557.   Specification of Letters Patent.   Patented Jan. 23, 1912.

Application filed August 17, 1911. Serial No. 644,562.

*To all whom it may concern:*

Be it known that I, HENRY GILLETTE, a citizen of the United States, residing at Belpre, in the county of Edwards, State of Kansas, have invented certain new and useful Improvements in Wheel-Rims; and I do hereby declare the following to be a full, clear, and exact description of the invention, such as will enable others skilled in the art to which it appertains to make and use the same.

This invention relates to an improvement in vehicle wheels in which the rim thereof is formed of wood, and has for its principal object to provide a novel means for preventing the shrinkage of said rim during dry weather.

Another object of the invention is to form a rim on its outer surface with two or more circumferential grooves, in each of which is disposed a tube, forming a reservoir, having a plurality of small perforations formed along its inner face whereby oil, which is located in said tube, is fed into the groove and thence into the rim whereby said rim is saturated with oil, and consequently prevented from shrinking.

A further object of the invention is to provide a device for the purpose described which can be readily attached to any wooden rim now in use without altering the construction thereof with the exception of forming said grooves, and which is simple in construction and cheap to manufacture.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction within the scope of the claims, may be resorted to without departing from the spirit or sacrificing any of the advantages of the invention.

In the drawing: Figure 1 is a cross sectional view through a wheel rim constructed in accordance with my invention, Fig. 2 is a sectional view of such a rim taken on the line 2—2 of Fig. 1; Fig. 3 is a cross sectional view through a wheel rim showing the modified construction of my invention.

Like reference numerals designate corresponding parts in all the figures of the drawing.

Referring to the drawing, the invention comprises a wooden rim 5 having a metallic tire 6 secured to the outer face thereof by any suitable means. Formed in the outer face of the rim is a pair of circumferential grooves 7—7, said grooves being disposed equi-distant from the center line of the rim. Located within each of the grooves is a single length of metal tubing 8. This tubing extends entirely around the rim, and one end 9 of said tube is reduced to enter the other end 10 of said tube to form a comparatively tight joint. The inner face of the tube, that is opposite the tire 6, is formed with a plurality of small perforations 11, which communicate with the inner portion of said groove and with the interior of the tube. Centrally formed in the outer face of each tube is an opening 12 which registers with a threaded opening 13 of similar size formed in the tire 6. Engageable with the threaded opening 13 is a closure screw 14, the inner end thereof fitting within the opening 12 of the tube.

From the foregoing, it will be observed that upon removal of the screw 14, oil can be fed through the opening 13 of the tire and the opening 12 of the tube and into said tube, said tube thus constituting a reservoir. After a sufficient amount of oil has been placed within the tube, the closure screw 14 is replaced. It will thus be observed that the oil will then pass through the small perforations 11 of the tube into the inner portion of the groove, and thence said oil will saturate the rim 5. It will thus be observed in this connection that by reason of the fact that the tubes are disposed equi-distant from the center line of the rim that both sides of the rim will be correspondingly affected by the oil, and consequently the rim will be affected in a uniform manner by said oil. It will further be noted that each groove and its respective tube are of corresponding sizes, so that the opposed sides of the tube will be caused to tightly bear against the side walls of the groove to prevent any of the oil leaking out between the tire and the rim.

In the modification illustrated in Fig. 3 of the drawing, the rim 5ª is provided with a metallic tire 6ª. Centrally formed in the rim is an opening 5ᵇ for receiving the tenons 5ᶜ of the spokes 5ᵈ. Formed in the outer face of the rim 5ª and communicating with the openings 5ᵇ is a pair of circumferential grooves 7ª. Located within each of the grooves is a single length of metal tubing 8 similar to that described above. It will thus be observed that in this construction, the oil which passes into the groove $7^a$ will also work its way into the opening $5^b$ and into the tenons $5^c$ of said spokes, thereby saturating the tenons and preventing their shrinking.

What is claimed is:

1. A wooden wheel rim having a circumferential groove formed in its outer face, and a continuous pipe constituting an oil reservoir disposed in said groove and formed with a plurality of perforations in its inner face.

2. A wooden wheel rim having a circumferential angular groove formed in its outer face, and a continuous pipe constituting an oil reservoir fitting snugly within the groove and bearing against the side walls thereof, said pipe being formed with a plurality of perforations in its inner face which communicate with the inner portion of the groove and the interior of the pipe.

3. A wooden wheel rim having a pair of circumferential grooves formed in its outer face and spaced equi-distant from the center line of the rim, and a continuous pipe constituting an oil reservoir disposed in each of said grooves and formed with a plurality of perforations in its inner face.

In testimony whereof, I affix my signature, in presence of two witnesses.

HENRY GILLETTE.

Witnesses:
J. G. BRIDWELL,
L. L. ANDERSON.

Copies of this patent may be obtained for five cents each, by addressing the "Commissioner of Patents. Washington, D. C."